US007965996B1

(12) United States Patent
Goldberg et al.

(10) Patent No.: US 7,965,996 B1
(45) Date of Patent: Jun. 21, 2011

(54) SYSTEM, METHOD, AND COMPUTER PROGRAM PRODUCT FOR CALCULATING A RATE OF AN ELECTRONIC MESSAGE UTILIZING AN IDENTIFIER OF AN ASSOCIATED SESSION (75) Inventors: Hillel Goldberg, Bet Shemesh (IL); Asher Kadoch, Bet Shemesh (IL)

(73) Assignee: Amdocs Software Systems Limited, Dublin (IE)

( * ) Notice: Subject to any disclaimer, the term of this patent is extended or adjusted under 35 U.S.C. 154(b) by 306 days.

(21) Appl. No.: 12/037,648

(22) Filed: Feb. 26, 2008

(51) Int. Cl.
*H04M 11/00* (2006.01)
(52) U.S. Cl. ..... 455/405; 455/408; 455/466; 455/434.2; 455/406.1; 379/114.04; 379/114.26; 379/121.03; 379/121.04
(58) Field of Classification Search .................. 455/408, 455/466, 405, 434.2, 406; 379/114.03, 114.26, 379/121.03, 121.04
See application file for complete search history.

(56) References Cited

U.S. PATENT DOCUMENTS

| 6,711,246 | B1 * | 3/2004 | Albal et al. ............... 379/126 |
| 7,111,044 | B2 | 9/2006 | Lee ............................. 709/204 |
| 7,424,291 | B1 * | 9/2008 | Lunsford et al. ............ 455/420 |
| 7,454,206 | B1 * | 11/2008 | Phillips et al. ............ 455/435.1 |
| 2005/0026592 | A1 * | 2/2005 | Walter et al. ............... 455/406 |
| 2006/0058006 | A1 * | 3/2006 | Hurtta et al. ............... 455/405 |
| 2007/0050510 | A1 | 3/2007 | Jiang ........................... 709/227 |

OTHER PUBLICATIONS

Kamlesh Chhugani, "IA V.UBP 4.0 CR Post4_Peg_E0522 R4 Pegasus HPPTT Impact Assessment (IA)" AMDOCS; May 10, 2007.

* cited by examiner

*Primary Examiner* — Kwasi Karikari
(74) *Attorney, Agent, or Firm* — Zilka-Kotab, PC (57) ABSTRACT

A system, method, and computer program product are provided for calculating a rate associated with an electronic message, utilizing an identifier of an associated session. In use, an identifier of a session is associated with an electronic message corresponding to the session. Furthermore, a rate associated with the electronic message is calculated, utilizing the identifier of the session.

19 Claims, 5 Drawing Sheets

SYSTEM, METHOD, AND COMPUTER PROGRAM PRODUCT FOR CALCULATING A RATE OF AN ELECTRONIC MESSAGE UTILIZING AN IDENTIFIER OF AN ASSOCIATED SESSION

FIELD OF THE INVENTION

The present invention relates to rating schemes, and more particularly to electronic message rating schemes.

BACKGROUND

Traditionally, electronic messages have been rated for a variety of purposes. For example, electronic message rates have oftentimes been utilized for billing a sender and/or recipient of the electronic messages. However, conventional techniques utilized for calculating such electronic message ratings have generally exhibited various limitations. Just by way of example, electronic messages are oftentimes rated individually as disconnected units, even in situations where the electronic messages may not necessarily be disconnected.

There is thus a need for addressing these and/or other issues associated with the prior art.

SUMMARY

A system, method, and computer program product are provided for calculating a rate associated with an electronic message, utilizing an identifier of an associated session. In use, an identifier of a session is associated with an electronic message corresponding to the session. Furthermore, a rate associated with the electronic message is calculated, utilizing the identifier of the session.

DETAILED DESCRIPTION

Figure 1:
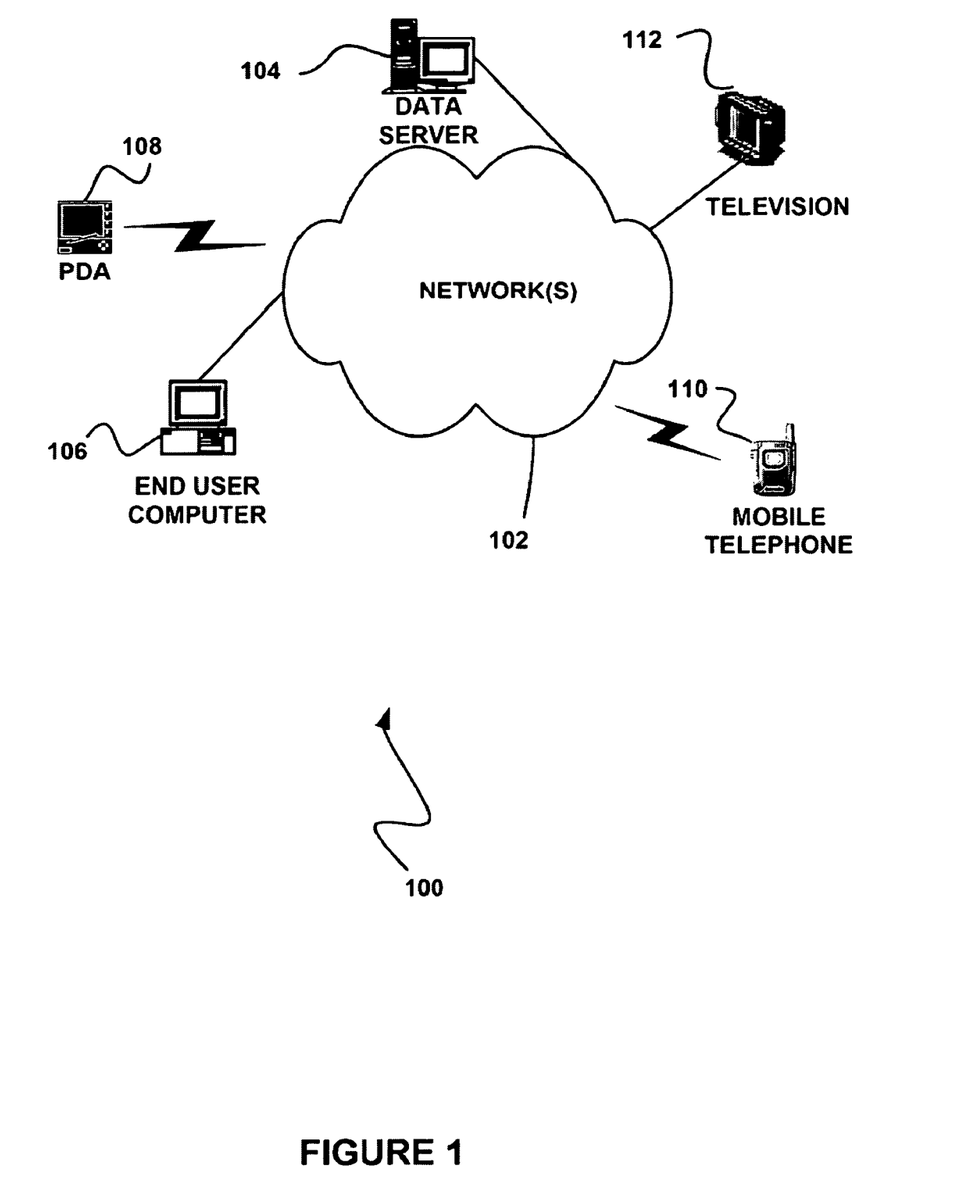
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
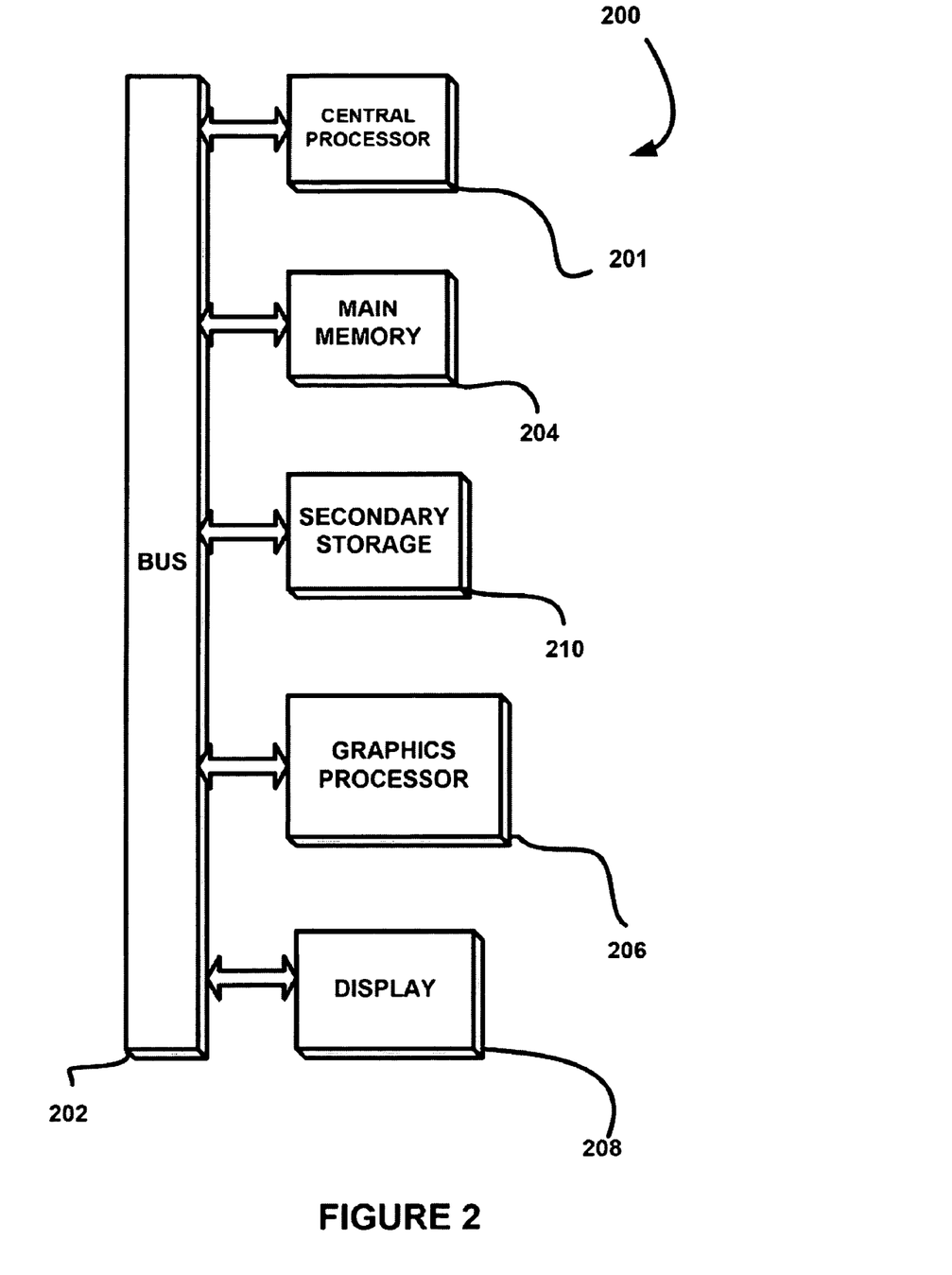
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
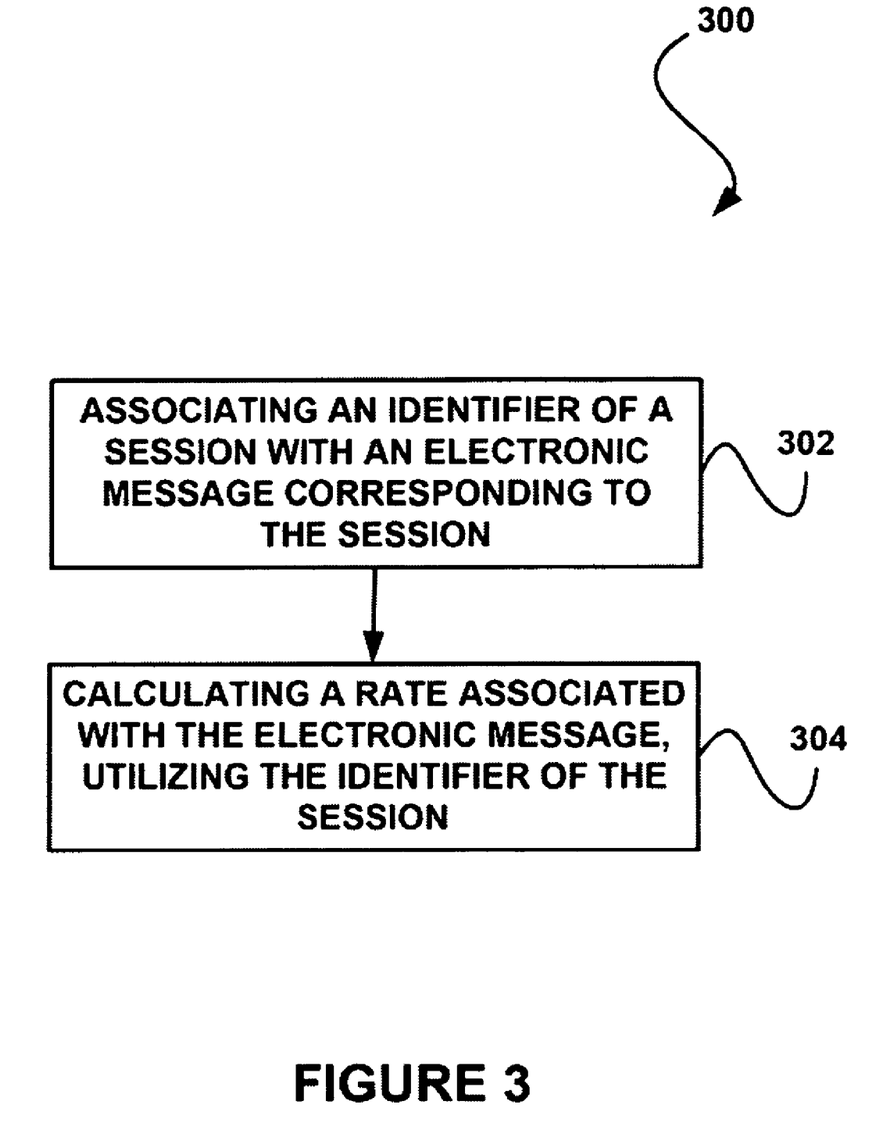
FIG. 3 illustrates a method for calculating a rate associated with an electronic message, utilizing an identifier of an associated session, in accordance with one embodiment.

FIG. 3 shows a method 300 for calculating a rate associated with an electronic message, utilizing an identifier of an associated session, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, an identifier of a session is associated with an electronic message corresponding to the session. In the context of the present description, the electronic message may include any message capable of being communicated electronically. For example, in various embodiments, the electronic message may include a short message service (SMS) message, a text message, a multimedia messaging service (MMS) message, etc.

In one embodiment, the electronic message may be sent by a device. As an option, the device may include a mobile device. Of course, however, the device may include any of the devices described above with respect to FIGS. 1 and/or 2. In another embodiment, the electronic message may be received by the device. Further, the electronic message may be sent/received via a network (e.g. such as any of the networks described above with respect to FIG. 1). To this end, the identifier of the session may optionally be associated with the electronic message in response to the sending and/or receiving of the electronic message by a device.

Additionally, the session to which the electronic message corresponds may include any linked series of electronic messages, with respect to the present description. For example, the session may include a series of electronic messages where each electronic message subsequent to an initial electronic message is sent in response (e.g. as a reply, etc.) to another (e.g. previous) one of the electronic messages. Accordingly, the session may include an on-going conversation that includes a plurality of electronic messages. In this way, the electronic message corresponding to the session may include any of the electronic messages included in the session.

Optionally, an application may be utilized for displaying the electronic messages associated with the session. For example, the application may display the electronic messages sequentially on a device receiving such electronic messages. As another example, the electronic messages included in the session may progressively scroll on a display of the device as a new electronic message is sent in association with the session.

In one embodiment, a plurality of devices may be associated with the session. Just by way of example, each of the devices may send and/or receive at least one of the electronic messages in the session. In this way, a plurality of devices may participate in the session. In another embodiment, only a single device participating in a conversation may be associated with the session. For example the single device may send each of the electronic messages in the session.

Furthermore, the identifier of the session may include any value, string, etc. capable of being utilized to identify the session. As an option, the session identifier may be unique to the session. Still yet, the identifier of the session may be associated with the electronic message in any desired manner.

In one embodiment, the identifier of the session may be associated with the electronic message by assigning such identifier to a record associated with the electronic message. For example, the identifier of the session may be assigned to a call description record (CDR) associated with the electronic message. As another example, the identifier of the session may be stored in the CDR associated with the electronic message. The identifier of the session may also be associated with each of the other electronic messages corresponding to the session, such that each of such electronic messages may be identified as being included in the session via the session identifier.

In addition, as shown in operation 304, a rate associated with the electronic message is calculated, utilizing the identifier of the session. With respect to the present description, the rate may include any value, rank, fee, etc. associated with the electronic message. As an option, the rate may be utilized for billing a user of a device associated with the session, such as the device that sent or received the electronic message associated with the calculated rate.

In one embodiment, the rate may include a rate for the electronic message. In another embodiment, the rate may include a rate for the session to which the electronic message corresponds. For example, the rate may be calculated for the session, and thus may encompass the electronic messages included in the session.

Moreover, the rate may be calculated in any desired manner that utilizes the identifier of the session. In one embodiment, the rate may be calculated utilizing a predefined rating scheme. Optionally, the rating scheme may be predefined by a service provider facilitating the session. The predefined rating scheme may include any desired parameters for calculating the rate, such as a recurring charge, a duration of the session, a time of day of the session, a number of devices associated with the session, a type of electronic message sent and/or received, etc.

Thus, in another optional embodiment, the rate may be based on a duration of the session. Further, the duration may be determined utilizing the identifier of the session. Just by way of example, the duration may be calculated by determining a time period between a first electronic message included in the session (e.g. an electronic message that initiated the session, etc.) and a last electronic message included in the session (e.g. a last electronic message included in the session since a predetermined period of time has elapsed, etc.).

The first electronic message and the last electronic message may be identified utilizing the identifier of the session by matching the identifier of the session to session identifiers associated with each of such first electronic message and last electronic message, and by further identifying a time in which each of the first electronic message and last electronic message were sent and/or received. The session identifiers and time may be identified from a CDR associated with each of the first electronic message and last electronic message, as an option.

Further, the first electronic message and the last electronic message may each be associated with (e.g. sent or received by) a single device. In this way, the duration of the session may include a duration of time in which the device participated (e.g. sent electronic messages and/or received electronic messages) in the session. Such device may include the device from which the electronic message associated with the calculated rate was sent or received. Similarly, a rate may be calculated for each device associated with the session, utilizing the identifier of the session.

As a further embodiment, the rate may also be based on a type of the electronic message associated with the calculated rate. In various embodiments, the type may include an opening electronic message (e.g. an initiator of a session, etc.), an in-flight electronic message, a closing electronic message (e.g. a terminator of a session, etc.), an electronic message utilized to reject a request to participate in a session, etc. The type of the electronic message may optionally be determined by an application associated with a device via which the electronic message is sent. In addition, the type of an electronic message may be assigned to the record (e.g. CDR) associated with such electronic message.

Each type of electronic message may be associated with a predefined rate and/or predefined rating scheme, as an option. Just by way of example, an electronic message utilized to reject a request to participate in a session may be rated as being free of charge, such that the electronic message may be excluded from consideration when calculating the rate for the session.

Furthermore, assigning a rejection type to the record associated with the electronic message may be utilized for preventing other electronic messages with the identifier of the session from being sent or received from the device which sent the rejection type electronic message. Thus, the rate associated with the electronic message may optionally be calculated utilizing the identifier of the session, the type of the electronic message, and any relevant sub-types (e.g. rejection type, etc.).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
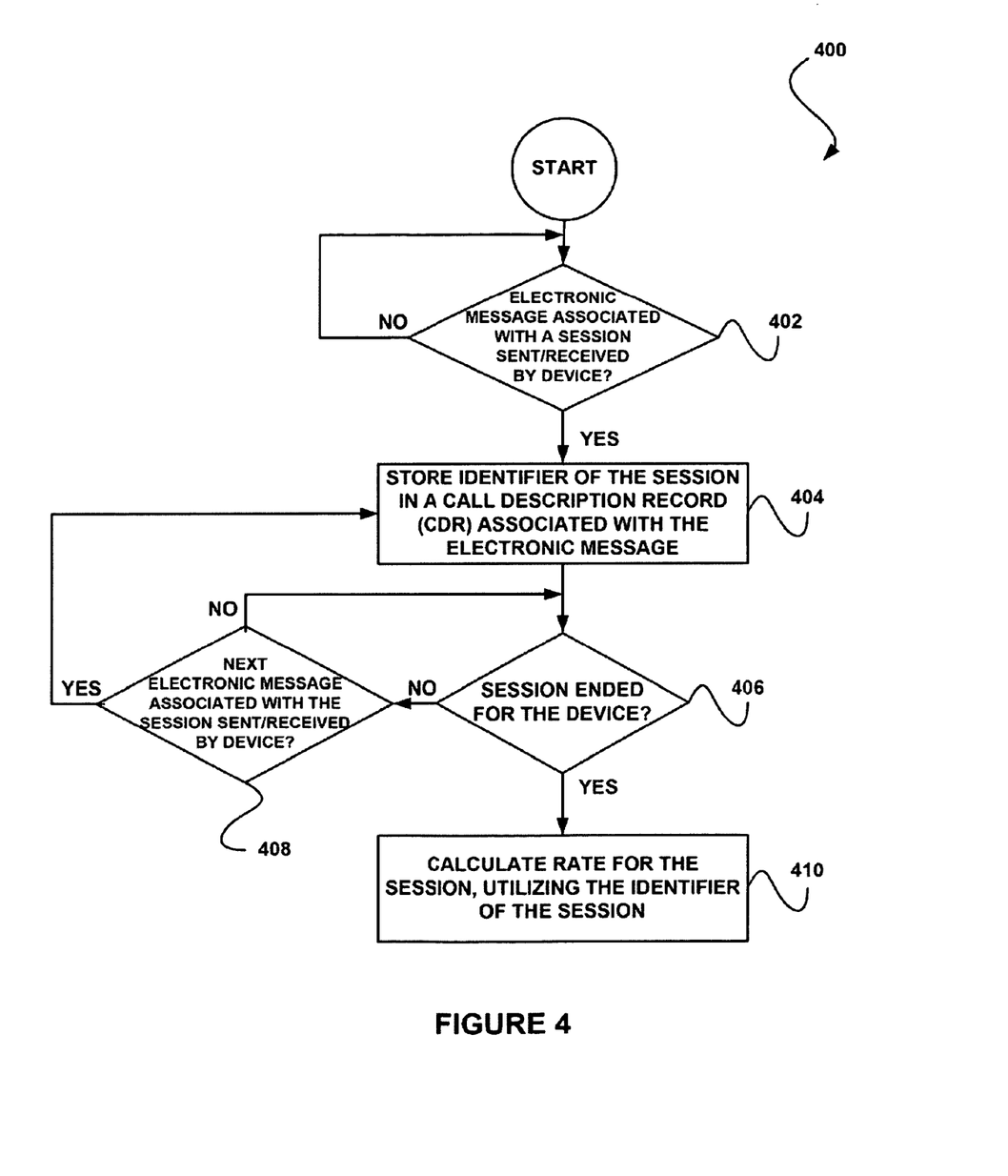
FIG. 4 illustrates a method for assigning an identifier of a session to an electronic message associated with the session, in accordance with another embodiment.

FIG. 4 illustrates a method 400 for assigning an identifier of a session to an electronic message associated with the session, in accordance with another embodiment. As an option, the method 400 may be carried out in the context of the details of FIGS. 1-3. Of course, however, the method 400 may be carried out in any desired environment. Further, the aforementioned definitions may equally apply to the description below.

As shown in decision 402, it is determined whether an electronic message associated with a session is sent or received by a device. Thus, the electronic message may be sent by the device to another device, in one embodiment. However, in another embodiment, the electronic message may be received by the device from another device.

In yet another embodiment, the electronic message may be determined to be associated with the session if the electronic message is sent or received in response to another electronic message included in the session. Such other electronic message may include an electronic message that initiated the session or any other electronic message included in the session that was sent or received subsequent thereto. Optionally, the other electronic message may be identified as being included in the session based on an associated session identifier.

In still yet another embodiment, the electronic message may be determined to be associated with the session if another electronic message is sent or received in response to the electronic message. Just by way of example, the electronic message may be identified as an initiator of the session if another electronic message is sent or received in response to the electronic message. Of course, however, it may be determined whether the sent or received electronic message is associated with a session in any desired manner.

Once it is determined that the sent or received electronic message is associated with a session, an identifier of the session is stored in a CDR associated with the electronic message. Note operation 404. It should be noted that the identifier of the session may be determined in any desired manner. Just by way of example, the identifier of the session may be stored in a look-up table (e.g. based on an initiator of the session, etc.). As another example, the identifier of the session may be determined by applying a predefined algorithm to parameters associated with the session (e.g. an initiator of the session, a time of initiation of the session, etc.).

Optionally, the identifier of the session may only be stored in the CDR associated with a received electronic message after verifying that the CDR does not already include the identifier of the session. For example, the CDR of a received electronic message may have already had the identifier of the session stored therein by another device from which the electronic message was sent.

Further, as shown in decision 406, it is determined whether the session has ended for the device. In the context of the present embodiment, the session may end for the device if the device is no longer a participant of the session. Of course, any technique may be utilized for determining whether the session has ended for the device.

In one embodiment, the determination may include determining whether the device has sent a predetermined type of electronic message associated with the session. For example, the predetermined type of electronic message may include an electronic message that closes the session for the device (e.g. such that the device is prevented from receiving or sending any further electronic messages associated with the session, etc.). As another example, the predetermined type of electronic message may include an electronic message that terminates the session for all devices associated with the session (e.g. such that the devices may no longer communicate via the session, etc.).

In another embodiment, the determination may include determining whether another device has sent a predetermined type of electronic message associated with the session. Just by way of example, it may be determined that the session has ended for the device if it is determined that another device associated with the session has sent an electronic message terminating the session. As another option, it may be determined that the session has ended for the device if it is determined that another device associated with the session has sent an electronic message closing the session for the device (e.g. thereby preventing the device from participating in the session, etc.).

In yet another embodiment, the determination may be based on a time period since a last electronic message was sent by any device in association with the session. To this end, the session may optionally end by timing out after passage of a predetermined period of time in which an electronic message associated with the session has not been sent. In still yet another embodiment, the determination may be based on a time period since an electronic message initiating the session was sent. For example, the session may be automatically terminated after a predetermined amount of time.

If it is determined that the session for the device has not ended, it is further determined whether a next electronic message associated with the session has been sent or received by the device. Note decision 408. The next electronic message may include any electronic message sent or received by the device in association with the session after an initial electronic message was sent or received by the device in association with the session (e.g. the electronic message determined in decision 402).

If it is determined that a next electronic message associated with the session has not been sent or received by the device, it is again determined whether the session has ended for the device (decision 406). In this way, the device may be continuously monitored for identifying electronic messages sent or received by such device until it is determined that a session for the device has ended.

If it is determined that a next electronic message associated with the session has been sent or received by the device, the identifier of the session is stored in a CDR associated with the electronic message. Note operation 404. Accordingly, an identifier of the session may be stored in a CDR associated with each electronic message sent or received by the device in association with the session. As noted above, the identifier of the session may only be stored in the CDR associated with a received electronic message after verifying that the CDR does not already include the identifier of the session.

Once it is determined that the session has ended for the device, a rate for the session is calculated, utilizing the identifier of the session, as shown in operation 410. Thus, the rate for the session may optionally only be calculated after the session has ended for the device. The rate for the session may be calculated in any desired manner.

Just by way of example, the rate for the session may be calculated based on a duration of the session, by identifying a time period between a first electronic message sent or received by the device that has an associated CDR that includes the identifier of the session and a last electronic message sent or received by the device that has an associated CDR that includes the identifier of the session. While the duration of the session is described herein as being determined by identifying a first electronic message sent or received and a last electronic message sent or received, it should be noted that in another embodiment, the duration of the session may only be determined based on electronic messages sent by the device (e.g. by identifying a first electronic message sent and a last electronic message sent by the device).

Figure 5:
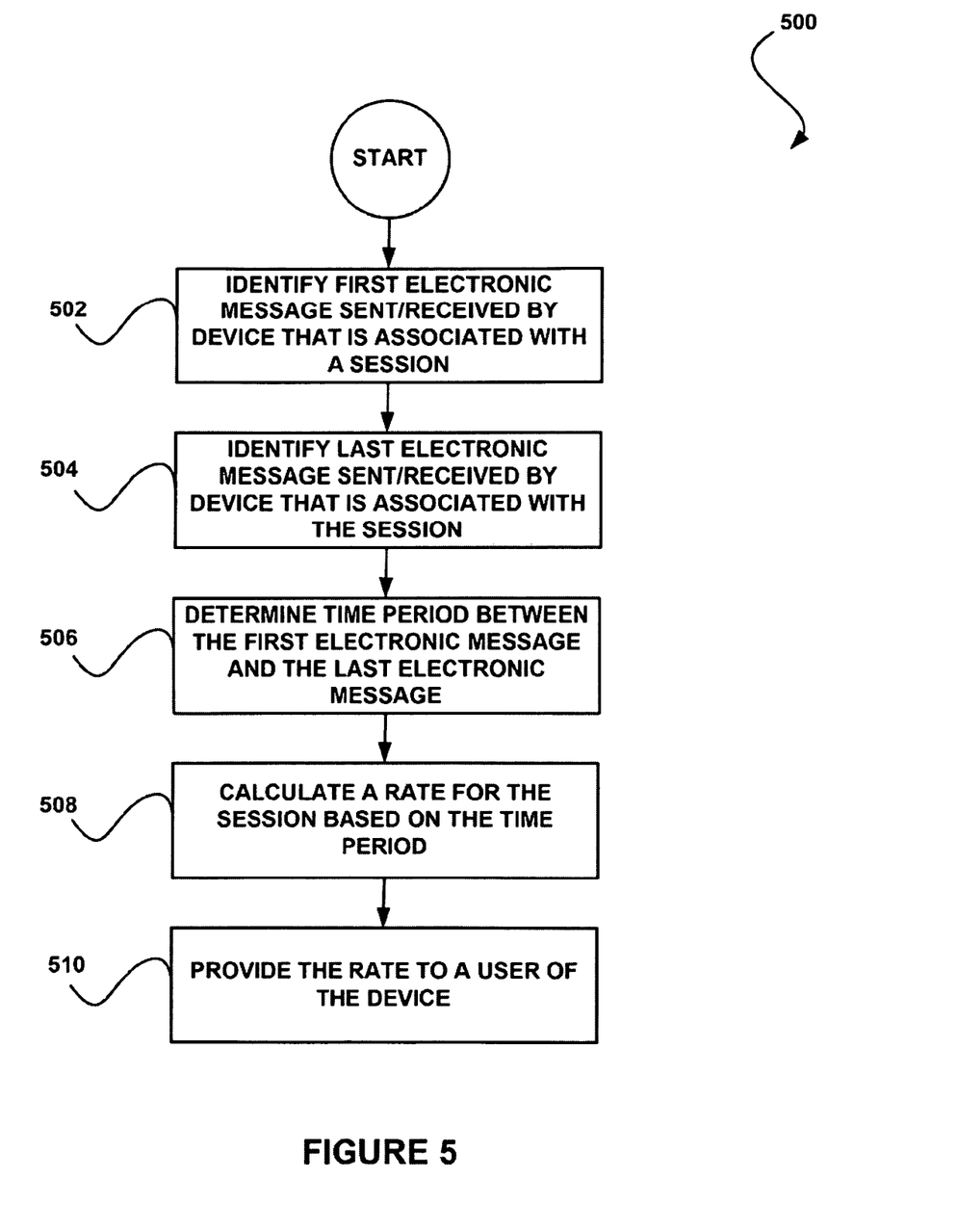
FIG. 5 illustrates a method for using an identifier of a session to calculate a rate for the session, in accordance with yet another embodiment.

FIG. 5 illustrates a method 500 for using an identifier of a session to calculate a rate for the session, in accordance with yet another embodiment. As an option, the method 500 may be carried out in the context of the details of FIGS. 1-3. Of course, however, the method 500 may be carried out in any desired environment. Again, the aforementioned definitions may equally apply to the description below.

As shown in operation 502, a first electronic message sent or received by a device that is associated with a session is identified. In one embodiment, the first electronic message may be identified utilizing a CDR associated with the first electronic message. For example, a CDR including an identifier of the session and indicating an earliest send or receive time may be identified, such that the electronic message associated with such CDR may be identified as the first electronic message. Of course, however, the first electronic message may be identified in any desired manner.

In addition, as shown in operation 504, a last electronic message sent or received by the device that is associated with the session is identified. As an option, the last electronic message may be identified utilizing a CDR associated with the last electronic message. Just by way of example, a CDR including an identifier of the session and indicating a latest send or receive time may be identified, such that the electronic message associated with such CDR may be identified as the last electronic message. It should be noted, however, the last electronic message may be identified in any desired manner.

Furthermore, a time period between the first electronic message and the last electronic message is determined, as shown in operation 506. The time period may optionally be determined by calculating a difference between the time associated with the last electronic message and the time associated with the first electronic message. As noted above, such times may be indicated for each of the first electronic message and the last electronic message by the respective associated CDRs.

Still yet, a rate for the session is calculated based on the time period. Note operation 508. In one embodiment, the rate may be calculated utilizing a predefined rating scheme that includes the time period as a parameter. Of course, the predefined rating scheme may also include other parameters for calculating the rate, such as a time of day of the session, a number of devices associated with the session, a number of electronic messages included in the session, a recurring charge, etc.

In another embodiment, the rate may be calculated utilizing a table. For example, the table may indicate a different rate for each of a plurality of predefined ranges of time periods. It should be noted, however, that the rate may be calculated in any manner that is based on the time period.

Moreover, as shown in operation 510, the rate is provided to a user of the device. As an option, the rate may be provided to the user as a fee for the session. For example, the rate may be provided in a bill to the user (e.g. monthly bill, etc.). As another option, the rate may be provided by a service provider facilitating the session (e.g. such as a mobile network service provider, etc.). In this way, the user of the device may be charged a single rate for a session, thus optionally preventing the provision of a plurality of rates for each individual electronic message sent and/or received during the session.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    computer code for identifying a first electronic message corresponding to a session;
    computer code for associating an identifier of the session with the first electronic message by including the identifier of the session in a first call detail record specific to the first electronic message;
    computer code for identifying a last electronic message corresponding to the session;
    computer code for associating the identifier of the session with the last electronic message by including the identifier of the session in a second call detail record specific to the last electronic message;
    computer code for determining a time period between the first electronic message and the last electronic message by:
        identifying from the first call detail record specific to the first electronic message a first time associated with the first electronic message;
        identifying from the second call detail record specific to the last electronic message a second time associated with the last electronic message; and
        calculating the time period as a difference between the first time and the second time; and
    computer code for calculating a rate associated with the first electronic message, based on the time period;
    wherein the computer program product is operable such that the last electronic message is identified based on a determination that a predetermined type of electronic message associated with the session has been sent, the predetermined type of electronic message including at least one of an electronic message terminating the session and an electronic message closing the session for a particular device.

2. The computer program product of claim 1, wherein the electronic message includes a short message service message.

3. The computer program product of claim 1, wherein the electronic message is sent or received by a device.

4. The computer program product of claim 1, wherein the session includes a linked series of a plurality of electronic messages.

5. The computer program product of claim 4, wherein the identifier of the session is associated with each of the plurality of electronic messages.

6. The computer program product of claim 4, wherein the first electronic message is included in the plurality of electronic messages.

7. The computer program product of claim 4, wherein the plurality of electronic messages include the first electronic message as a response to a second electronic message.

8. The computer program product of claim 4, wherein each of a plurality of mobile devices at least one of sends and receives at least one of the plurality of electronic messages.

9. The computer program product of claim 1, wherein the first call detail record includes a call description record.

10. The computer program product of claim 1, wherein the rate is based on a duration of the session.

11. The computer program product of claim 1, wherein the first electronic message and the last electronic message are sent by a single mobile device.

12. The computer program product of claim 1, wherein the rate associated with the electronic message includes a rate for the session.

13. The computer program product of claim 1, wherein the rate includes a fee for the session.

14. The computer program product of claim 1, wherein the rate is based on a type of the first electronic message.

15. The computer program product of claim 1, wherein the last electronic message is further identified based on a determination that a time period since the last electronic message was sent has passed.

16. The computer program product of claim 1, wherein a separate call detail record is generated for each electronic message corresponding to a session.

17. A method, comprising:

identifying a first electronic message corresponding to a session;

associating an identifier of the session with the first electronic message by including the identifier of the session in a first call detail record specific to the first electronic message;

identifying a last electronic message corresponding to the session;

associating the identifier of the session with the last electronic message by including the identifier of the session in a second call detail record specific to the last electronic message;

determining a time period between the first electronic message and the last electronic message by:

identifying from the first call detail record specific to the first electronic message a first time associated with the first electronic message;

identifying from the second call detail record specific to the last electronic message a second time associated with the last electronic message; and calculating the time period as a difference between the first time and the second time; and calculating a rate associated with the first electronic message, utilizing a processor, based on the time period;

wherein the last electronic message is identified based on a determination that a predetermined type of electronic message associated with the session has been sent, the predetermined type of electronic message including at least one of an electronic message terminating the session and an electronic message closing the session for a particular device.

18. A system, comprising:

a processor for:

identifying a first electronic message corresponding to a session;

associating an identifier of the session with the first electronic message by including the identifier of the session in a first call detail record specific to the first electronic message;

identifying a last electronic message corresponding to the session;

associating the identifier of the session with the last electronic message by including the identifier of the session in a second call detail record specific to the last electronic message;

determining a time period between the first electronic message and the last electronic message by:

identifying from the first call detail record specific to the first electronic message a first time associated with the first electronic message;

identifying from the second call detail record specific to the last electronic message a second time associated with the last electronic message; and calculating the time period as a difference between the first time and the second time; and calculating a rate associated with the first electronic message, based on the time period;

wherein the processor is operable such that the last electronic message is identified based on a determination that a predetermined type of electronic message associated with the session has been sent, the predetermined type of electronic message including at least one of an electronic message terminating the session and an electronic message closing the session for a particular device.

19. The system of claim 18, wherein the processor is in communication with memory and a display via a bus.

* * * * *